US005906033A

United States Patent [19]

Mukaiyama

[11] Patent Number: 5,906,033

[45] Date of Patent: May 25, 1999

[54] LENGTH ADJUSTING DEVICE FOR FASTENING STRAPS OF A MASK

[75] Inventor: Etsuji Mukaiyama, Higashiosaka, Japan

[73] Assignee: Yamamoto Kogaku Co., Ltd., Osaka, Japan

[21] Appl. No.: 09/010,662

[22] Filed: Jan. 22, 1998

[30] Foreign Application Priority Data

Jan. 22, 1997 [JP] Japan .................................... 9-009699

[51] Int. Cl.[6] ............................ A44B 11/00; F16G 11/00

[52] U.S. Cl. ............................... 24/580; 24/16 R; 24/18; 24/129 B

[58] Field of Search ............................ 24/580, 18, 17 B, 24/129 B, 16 R, 625, 300, 572, 482

[56] References Cited

U.S. PATENT DOCUMENTS 1,810,027 6/1931 Moran et al. ............................ 24/580
2,208,026 7/1940 Goldenberg ............................ 24/580
2,458,252 1/1949 Chatterton ............................ 24/18
2,738,509 3/1956 Bauder ............................ 24/580
3,261,100 7/1966 Quenot ............................ 24/16 R
4,577,375 3/1986 Beaussant ............................ 24/580
4,639,977 2/1987 Howard ............................ 24/129 B

*Primary Examiner*—Victor N. Sakran
*Attorney, Agent, or Firm*—Koda & Androlia

[57] ABSTRACT

A length adjusting device for fastening straps of a mask includes an oblong elastic thin plate with a plurality of stepped hook portions. One strap of fastening straps of the mask is to be detachably fitted at a base end portion of the elastic thin plate and another strap of the mask is to be engageably fitted on the stepped hook portions. The elastic thin plate may have a piercing hole at its base end portion, into which the strap of the mask is to be detachably fitted, and/or have opposing hook portions which opposingly project from both its upper and lower sides and incline toward the base end of the elastic thin plate. The piercing hole may have a cut and the cut may extend slantingly toward a tip side of the elastic thin plate.

5 Claims, 13 Drawing Sheets

PRIOR ART

PRIOR ART

PRIOR ART

LENGTH ADJUSTING DEVICE FOR FASTENING STRAPS OF A MASK

BACKGROUND OF THE INVENTION

1. Field of the Invention

The present invention relates to a length adjusting device for fastening straps of various masks, and in particular a length adjusting device suitable for a dustproof mask in which decreasing a gap between the mask and its wearer's face is required for preventing intrusion of harmful materials such as dust.

2. Prior Art

A conventional mask of this type is, as shown in FIGS. 10 and 11, provided with a mechanism for adjusting the length of fastening straps 12 at fitting portions of the straps 12 to the mask 11. This adjusting mechanism includes extruding pieces 13 respectively provided at upper and lower portions on both lateral sides of an edge portion of the mask 11, each of which has a through hole 16 with a notch 15 continued from a guiding groove 14, and a stopper 17 with an inlet and an outlet 17*a* on both sides, the stopper 17 bridging over the notch 15. A tip portion of the strap 12 of the mask 11 is inserted into the through hole 16 from thereunder, stretched over the stopper 17, into the inlet and outlet 17*a* thereof in the direction from the guiding groove 14 along the notch 15 and back again into the through hole 16, so that the fastening strap 12 is kept there immovably by the stopper 17. The length of the fastening strap 12 of the mask 11 is adjusted by the extent of insertion of the tip portion of the fastening strap 12 which is inserted through the through hole 16 from below.

Another known mask of this type that is capable of adjusting the length of straps includes a strap 12 provided with an engaging member 18 as shown in FIG. 12. Referring to FIG. 13, this engaging member 18 includes retaining holes 19 through which the fastening strap 12 of the mask 11 is inserted and by which the engaging member 18 is retained there, and an engaging portion 20 with which the other fastening strap 12' of the mask 11 is to be engaged. The engaging member 18 is fitted to the fastening strap 12 of the mask 11 that has passed through the retaining holes 19 before the fastening strap 12 is fixed to the extruding pieces 13 provided at the edge portion of the mask 11.

As stated above, conventional adjusting mechanisms for fastening straps of masks have complicated structures, are difficult to produce and entail rather high production costs, which are problems to be solved. Furthermore, the complicated structures cause the adjustment of the fastening straps 12 to a suitable length to be cumbersome. Therefore, even though the space between the mask 11 and a wearer's face could be narrowed, there still remains a problem to be solved; i.e. the straps 12 are likely to be fastened too tight or too loose and a comfortable fit is difficult to obtain.

It is further not sufficient to adjust the straps 12 to a suitable length by simply adding only the engaging member 18 to the adjusting mechanism for fastening straps of the mask. Moreover, since the engaging member 18 is designed to be fitted to one of the fastening straps 12 of the mask 11 in a manner that the strap 12 pierces through the retaining holes 19 of the member 18 before the fastening strap 12 is fixed to the extruding members 13 provided on the edge portion of the mask 11, the engaging member 18 cannot be removed from the fastening strap 12 readily even when the member 18 is not necessary.

OBJECTS AND SUMMARY OF THE INVENTION

The present invention is hence made in order to solve the foregoing problems. It is an object of the present invention to provide a length adjusting device for fastening straps of a mask which is simply constituted and easy to be produced at a small production cost, allows easy adjustment of the straps to a suitable length, provides a comfortable fit and is readily removable from the straps when it is not needed.

The length adjusting device for fastening straps of a mask according to the present invention includes an oblong elastic thin plate. One of the fastening straps of a mask is to be detachably fitted at a base end portion of the elastic thin plate. The oblong plate is provided with a plurality of stepped hook portions on which the other one of the straps of the mask is to be engageably fitted.

The length adjusting device for fastening straps of a mask of the present invention may have piercing holes at the base end portion of the elastic thin plate, into which the one of the fastening straps of the mask is to be detachably fitted. The device may also have opposing hook portions which extrude from both its upper and lower sides and incline toward the base end of the elastic thin plate.

Furthermore, in the length adjusting device for fastening straps of a mask of the present invention, the piercing holes may have a cut. The cut may extend slantingly toward a tip side of the elastic thin plate.

The above and other objects, features and advantages of the present invention will become apparent from the following description in conjunction with the accompanying drawings.

DETAILED DESCRIPTION OF THE PREFERRED EMBODIMENTS

Preferred embodiments of a length adjusting device for fastening straps of a mask according to the present invention are described in detail below with reference to the accompanying drawings.

The length adjusting device for fastening straps of a mask according to the present invention includes an oblong elastic thin plate 1, at a base end portion (the right side end portion in FIG. 1) of which one of straps 3, 3' of a mask 2 is to be detachably fitted. In addition, the elastic thin plate 1 includes plural stepped hook portions 4, so that the other one of the straps 3, 3' can be selectively engaged on a suitable portion. Selection of the stepped portions may vary the distance between two straps and the over-all length of fastening straps. FIGS. 1 to 4, FIG. 5, FIG. 6 and FIG. 7 respectively illustrate a first, a second, a third and a fourth embodiment of the present invention.

Figure 1:
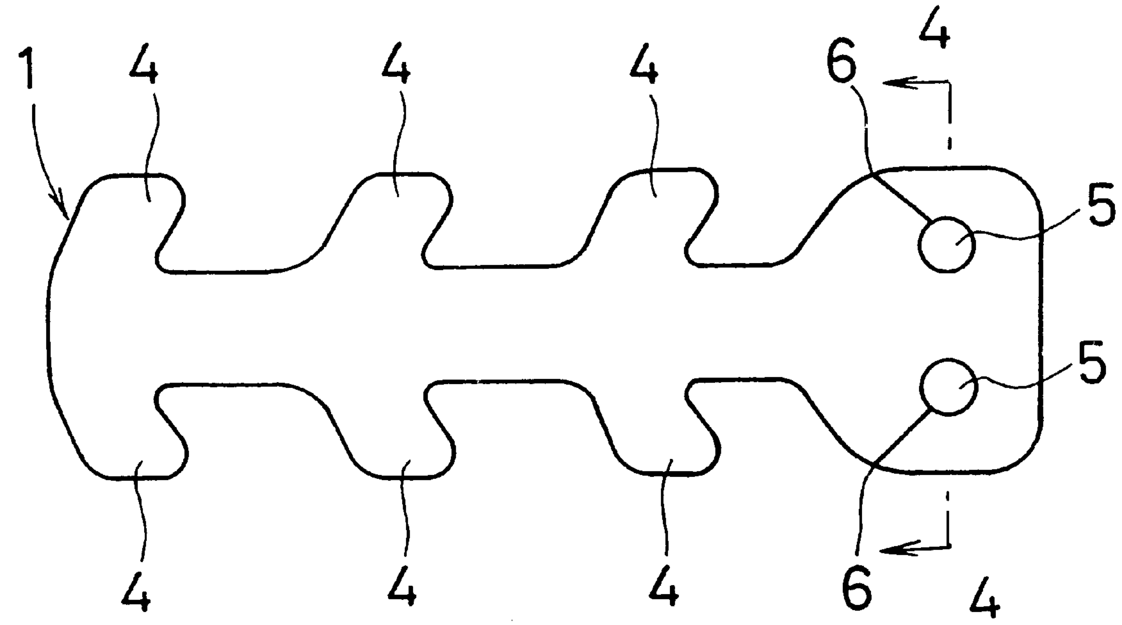
FIG. 1 is a front view of a first embodiment of the length adjusting device for fastening straps of a mask according to the present invention.
Figure 2:
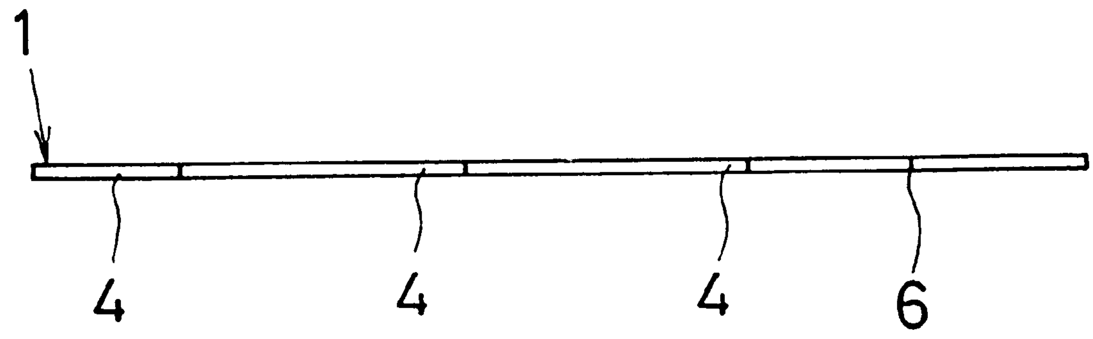
FIG. 2 is a bottom view of the first embodiment of the length adjusting device for fastening straps of a mask according to the present invention.
Figure 3:
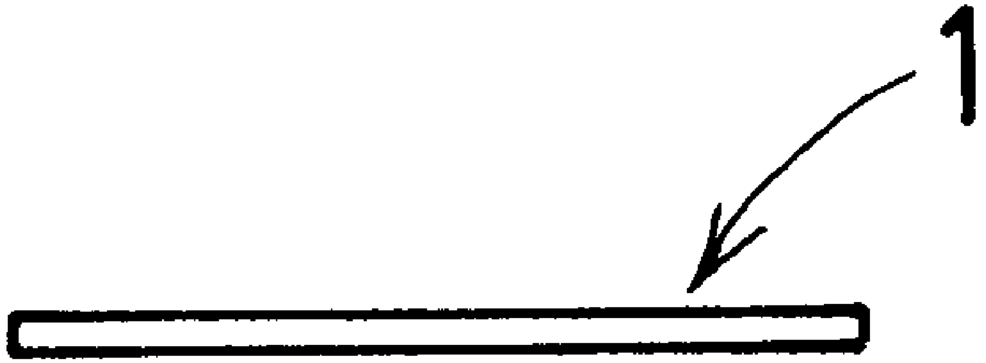
FIG. 3 is a side view of the first embodiment of the length adjusting device for fastening straps of a mask according to the present invention.
Figure 4:
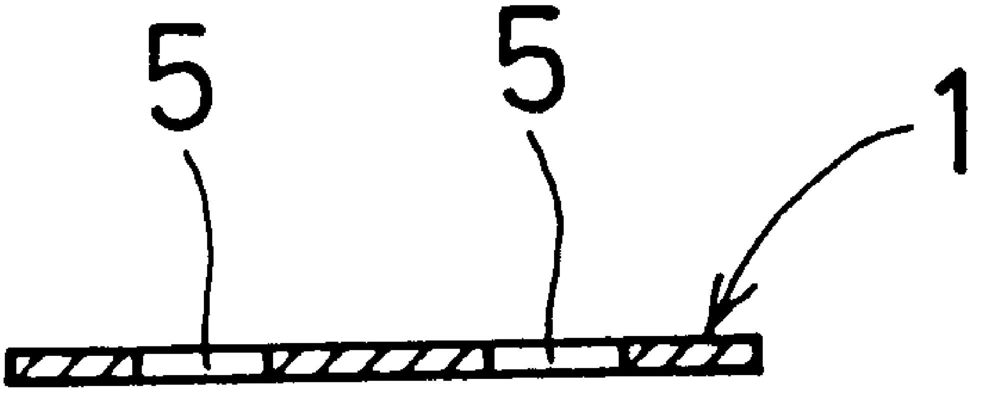
FIG. 4 is a line 4—4 sectional view in FIG. 1.
Figure 5:
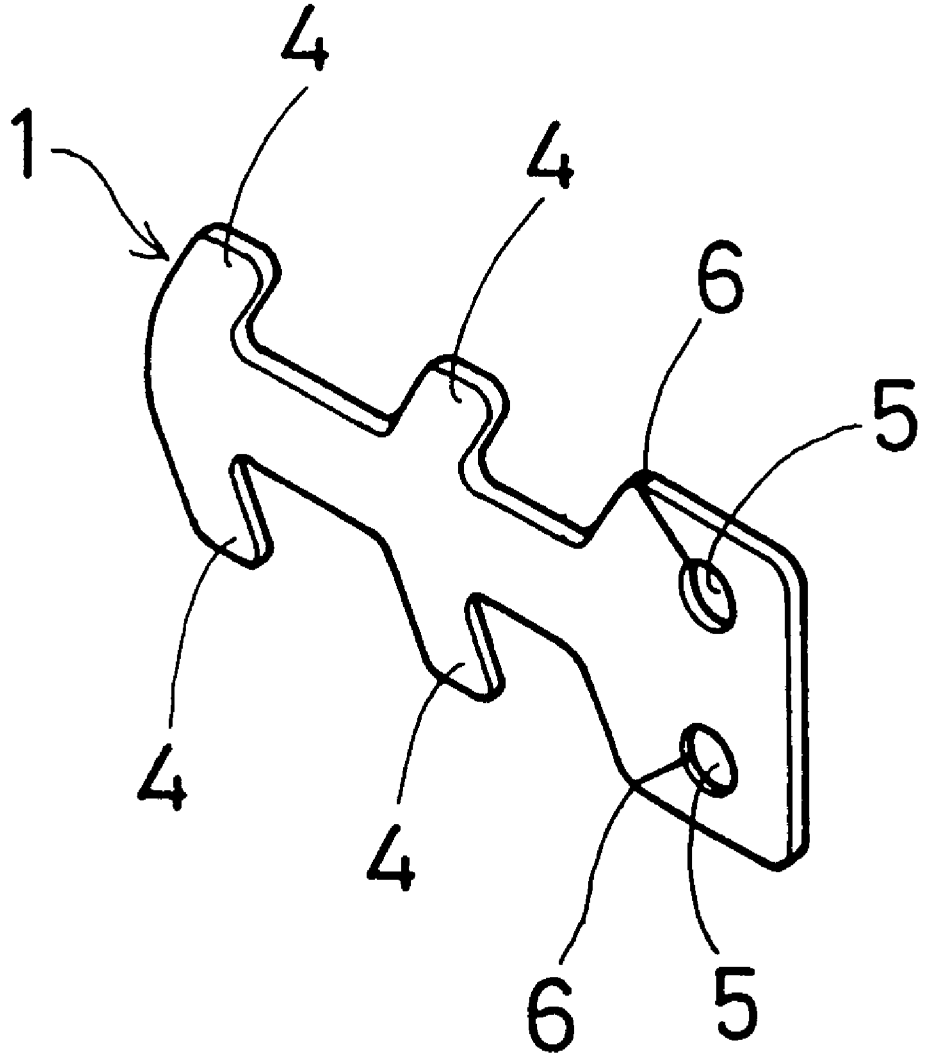
FIG. 5 is perspective view of a second embodiment of the length adjusting device for fastening straps of a mask according to the present invention.
Figure 6:
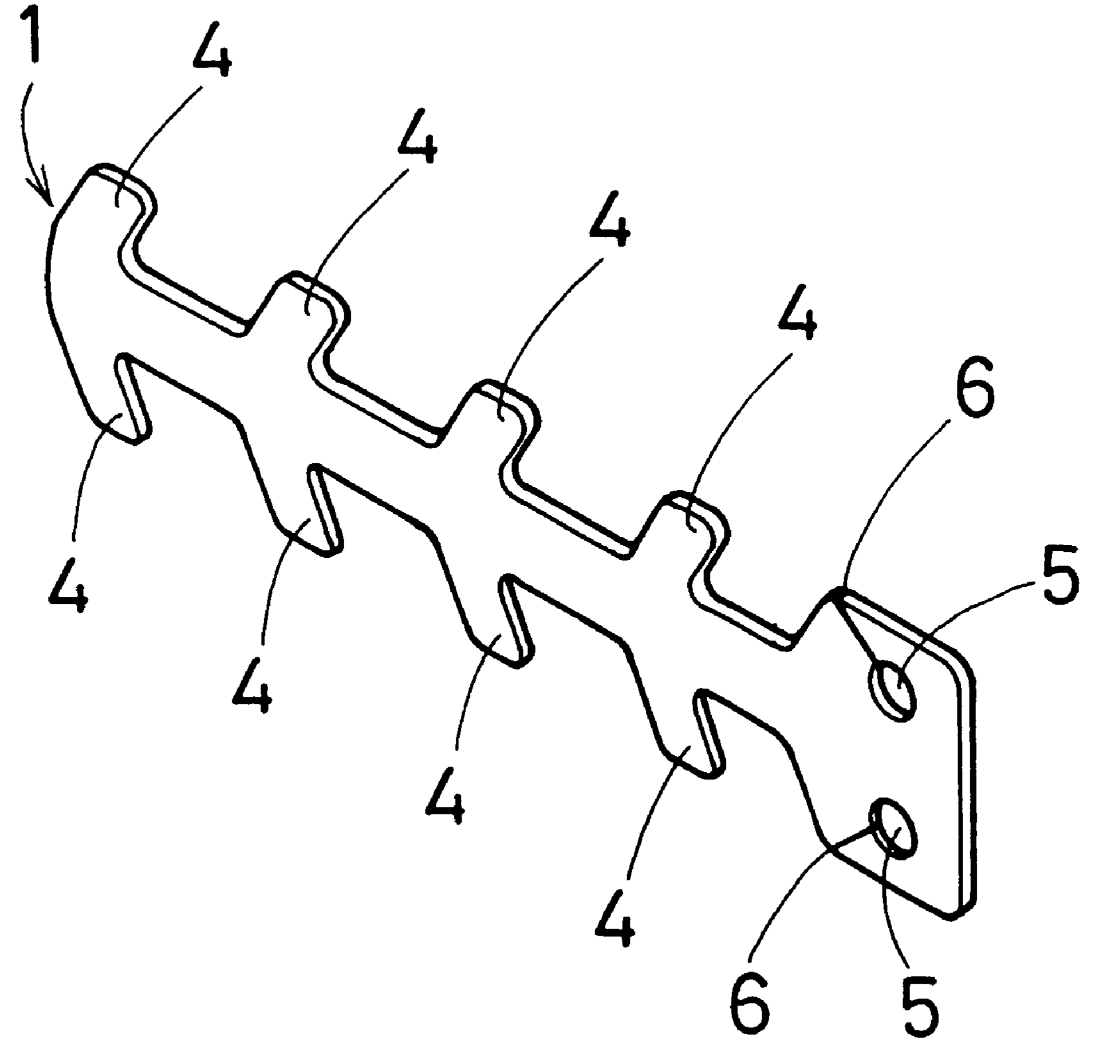
FIG. 6 is a perspective view of a third embodiment of the length adjusting device for fastening straps of a mask according to the present invention.

Here in the specification, a base end portion of the elastic thin plate 1 denotes the right side end portion thereof in FIG. 1, while a tip side end portion denotes the left side end portion. The strap 3 is described as one of the straps to be detachably fitted at the base end portion of the thin plate 1 and the other strap 3' as the other to be engageably fitted or hooked on the plural stepped hook portions 4, however they are, of course, exchangeable.

The elastic thin plate 1 has elasticity which allows the thin plate 1 to bend along with the configuration of a wearer's head without the other strap 3' coming off from the hook portions 4 of the thin plate 1, when a mask is used with the elastic thin plate 1 which is fitted to the strap 3 of the mask. The base end portion of the elastic thin plate 1 is provided with piercing holes 5, each of which may be, if necessary, provided with a cut 6. The cut 6 may be provided at any portion of the base end portion as long as it reaches to the piercing hole 5 and a base end outer edge of the thin plate 1. It is preferable that the width of the cut be narrower than the thickness of the fastening strap 3 or that there is a simple cut with no gap as shown in the drawings, and that the cut inclines toward the tip side of the elastic thin plate 1, so that the strap 3 is prevented from coming off from the cut 6 when fitted to the elastic thin plate 1. In the embodiments shown in FIGS. 1 to 6, the piercing holes 5 have a diameter substantially equal to the width of the fastening strap 3 of the mask 2. The number of piercing hole 5 may be one as long as it is provided on the base end portion of the elastic thin plate 1. As shown in these embodiments, however, disposing two piercing holes at an upper and a lower part of the base end portion preferably provides the elastic thin plate 1 with little or no movability when fixed to the strap 3 of the mask 2 and maintains a stable fitting. On the other hand, the piercing hole 5 of the embodiment in FIG. 7 includes a long hole **5*a* through which all of the plural stepped hook portions 4, 4' of the elastic thin plate 1 can be pierced by being folded back from the tip end portion, and stepped portions 5*b* between which a narrowed portion 7 behind the last stepped hook portions 4' which pierce through the long hole 5*a* is fitted and with which the back ends of the last stepped hook portions 4' abut to prevent the plural stepped hook portions 4, 4' from moving through the hole 5**.

The elastic thin plate 1 may be made of various materials, but thermoplastic resin such as polypropylene would be preferable because the elastic thin plate 1 having a piercing hole or holes 5, a cut or cuts 6 and plural stepped hook portions is easily drawn out at one time when the elastic thin plate 1 is made of a thermoplastic material.

The hook portions 4 may be of any shape as long as a fastening strap 3' of the mask 2 can be engaged or hooked thereon. In the embodiments of the drawings, the hook portions 4 are provided projectingly at opposing positions on the upper and lower sides of the elastic thin plate 1 in an inclining manner toward the base end of the elastic thin plate 1 in order to facilitate engagement of the strap 3' of the mask 2 thereon. Here an upper and a lower opposing projecting portion work as a set to engage with the strap 3'. The elastic thin plates of the first and fourth embodiments shown in FIGS. 1 to 4 and FIG. 7 have three steps, the elastic thin plate 1 of the second embodiment shown in FIG. 5 has two steps, and and the third embodiment of the elastic thin plate 1 shown in FIG. 6 has four steps; but the elastic thin plate 1 may have more than four steps. There will be a variety of length adjusting devices depending on the number of stepped portions and/or the distance between adjacent stepped portions, and resulting in meeting the various demands.

Figure 8:
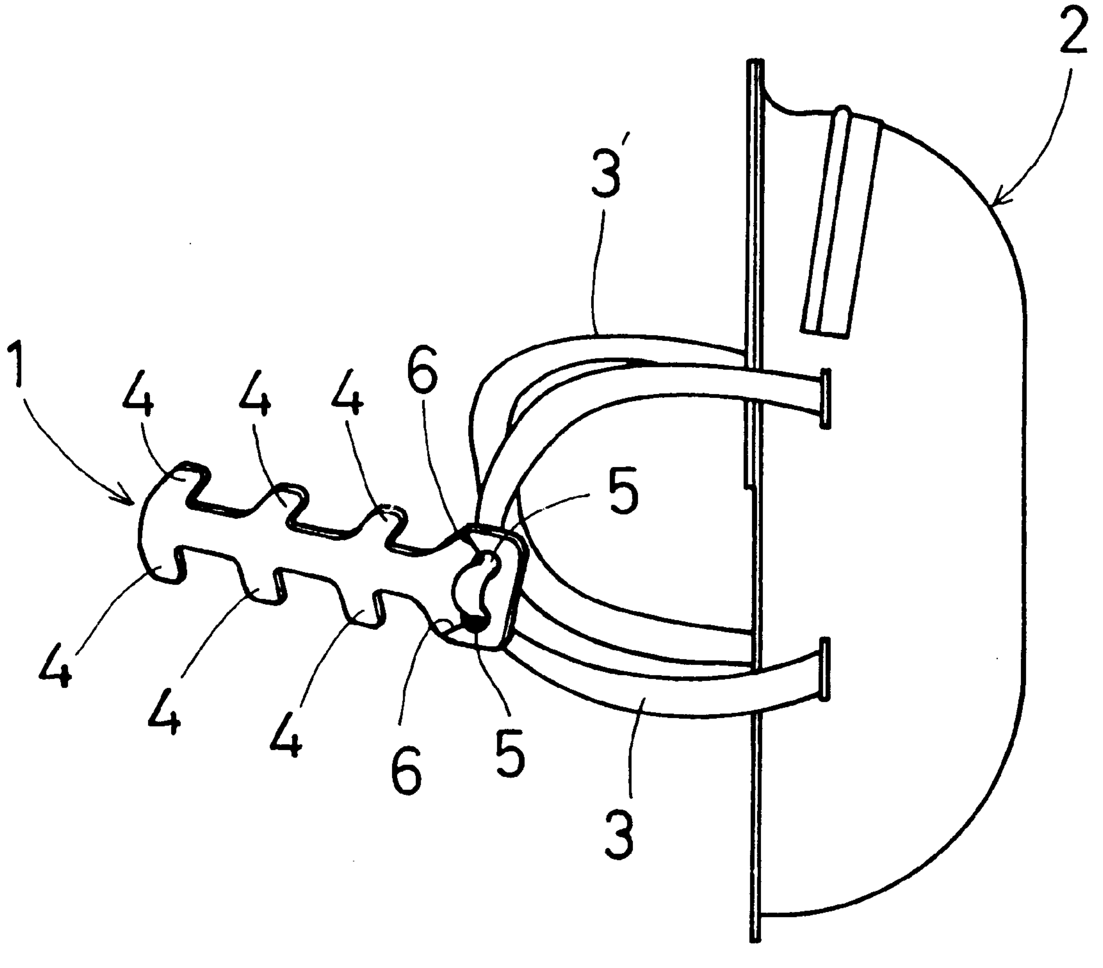
FIG. 8 is an explanatory view showing a state where the length adjusting device of the first embodiment is fitted to one of the fastening straps of the mask.

In use of the length adjusting device for fastening straps of a mask according to the present invention, which is constituted as stated above and illustrated in FIGS. 1 to 6, a wearer opens one of the cuts 6 of the piercing holes 5 on the elastic thin plate 1 with his fingers, puts one strap 3 fitted to the edge of the mask 2 by means of proper engaging members into an associated piercing hole 5 through the opened cut 6, and releases his fingers, then the cut 6 automatically returns to the original state by the elasticity of the elastic thin plate 1. After the fastening strap 3 is fitted into the one of the upper and lower piercing holes 5 with the above manipulation, the strap 3 is then similarly put into the other of the piercing holes 5. As a result, the length adjusting device can be fitted to the fastening strap 3 of the mask 2 in a less-movable, reliable state, as shown in FIG. 8. In case of the piercing holes 5 with no cut, the strap 3 may be simply put through the holes 5 and thereby the length adjusting device can be fitted to the fastening strap 3 of the mask 2.

Figure 7:
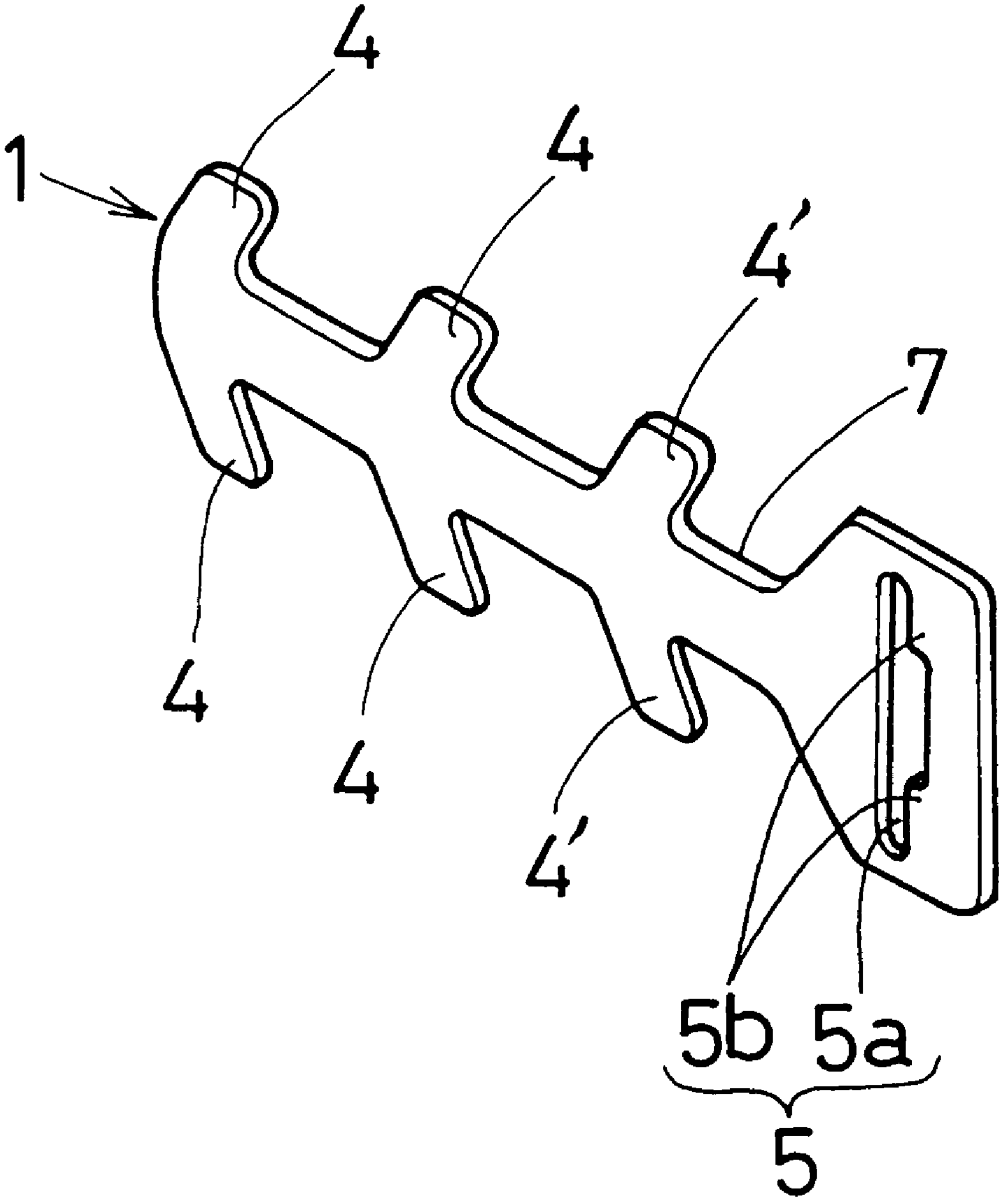
FIG. 7 is a perspective view of a fourth embodiment of the length adjusting device for fastening straps of a mask according to the present invention.
Figure 9:
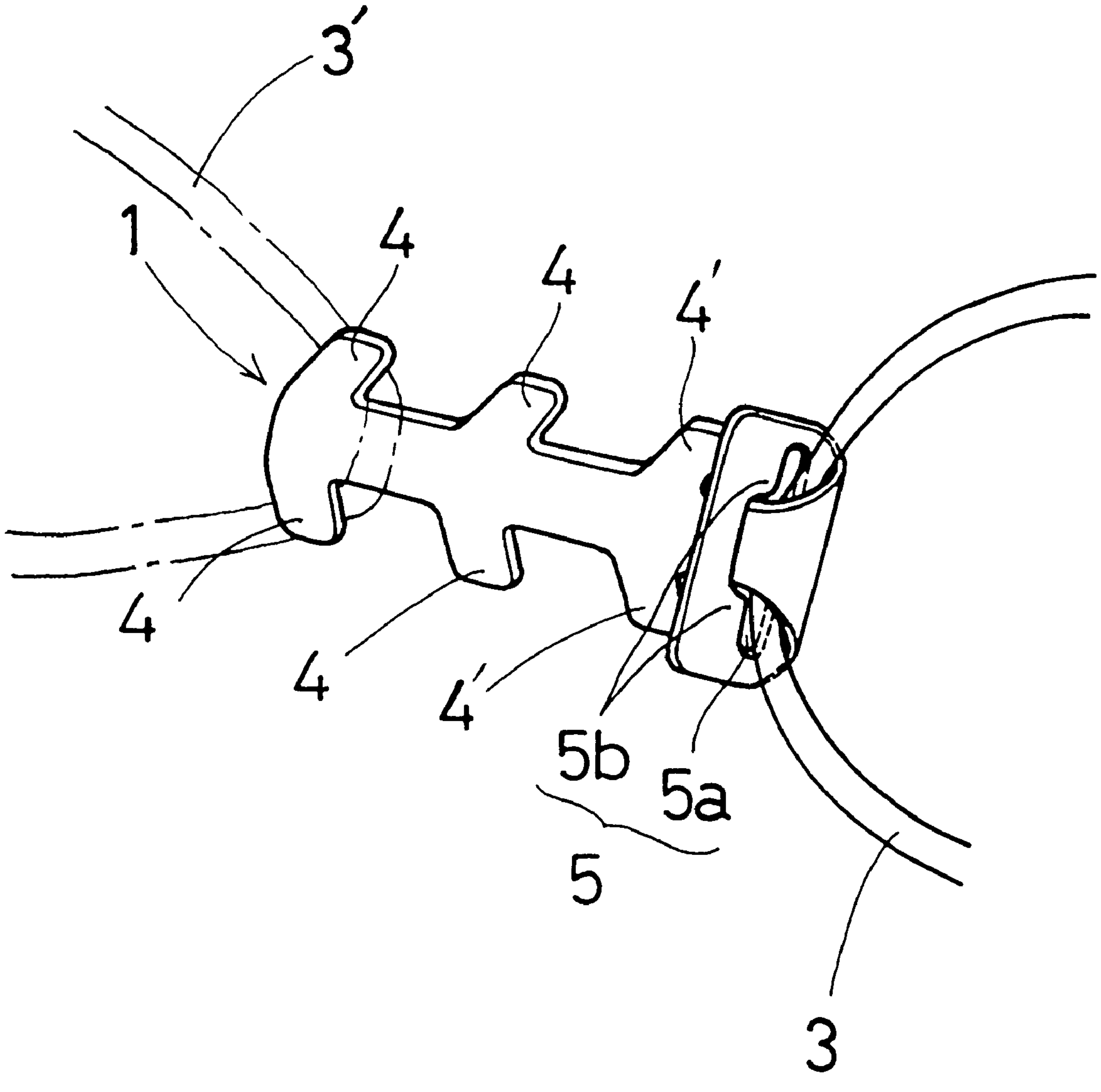
FIG. 9 is an explanatory view showing a state where the length adjusting device of the fourth embodiment is attached to a fastening strap of the mask.
Figure 10:
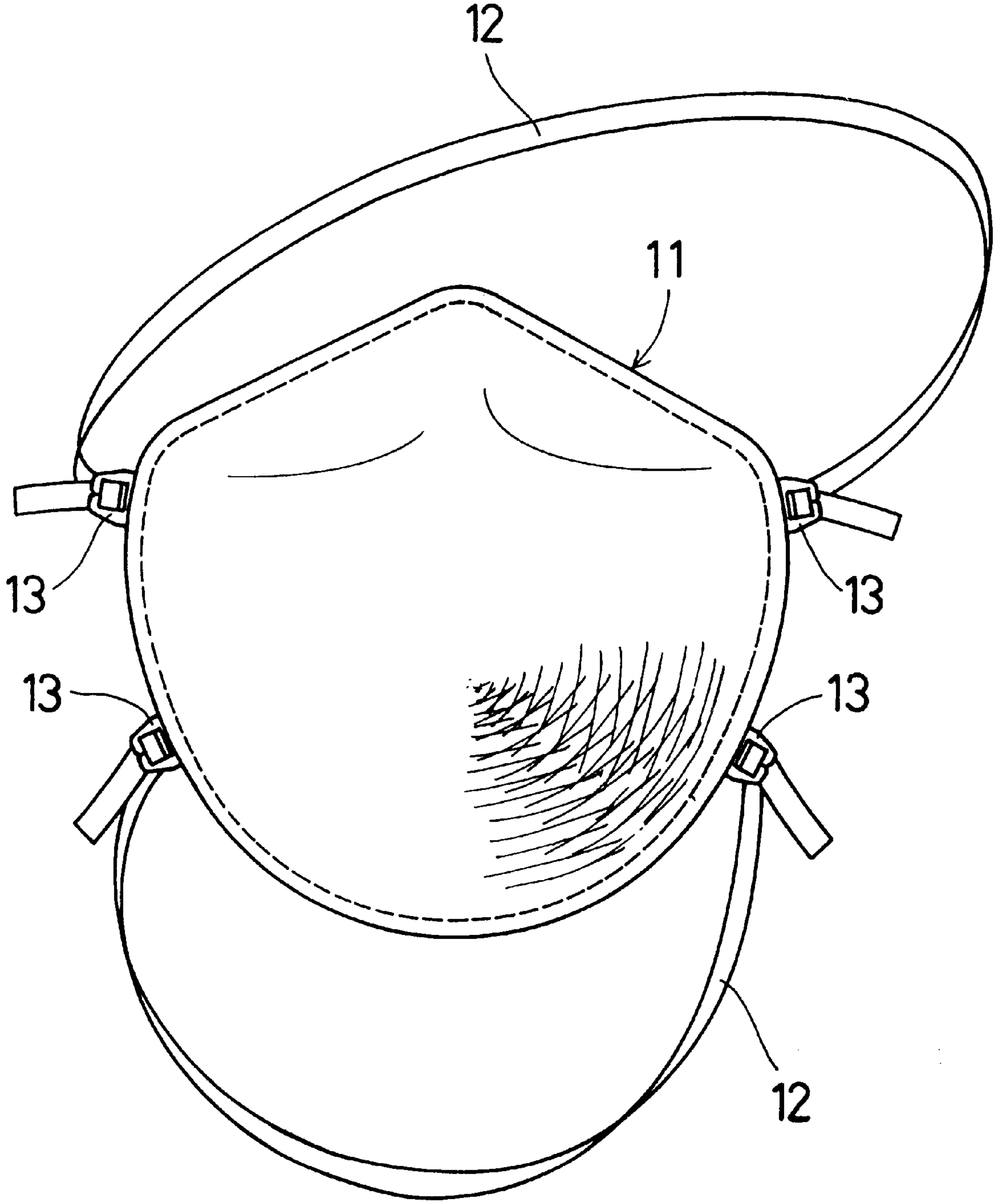
FIG. 10 PRIOR ART
FIG. 10 is an explanatory view showing one example of a conventional mask including length adjusting mechanisms for fastening straps.
Figure 11:
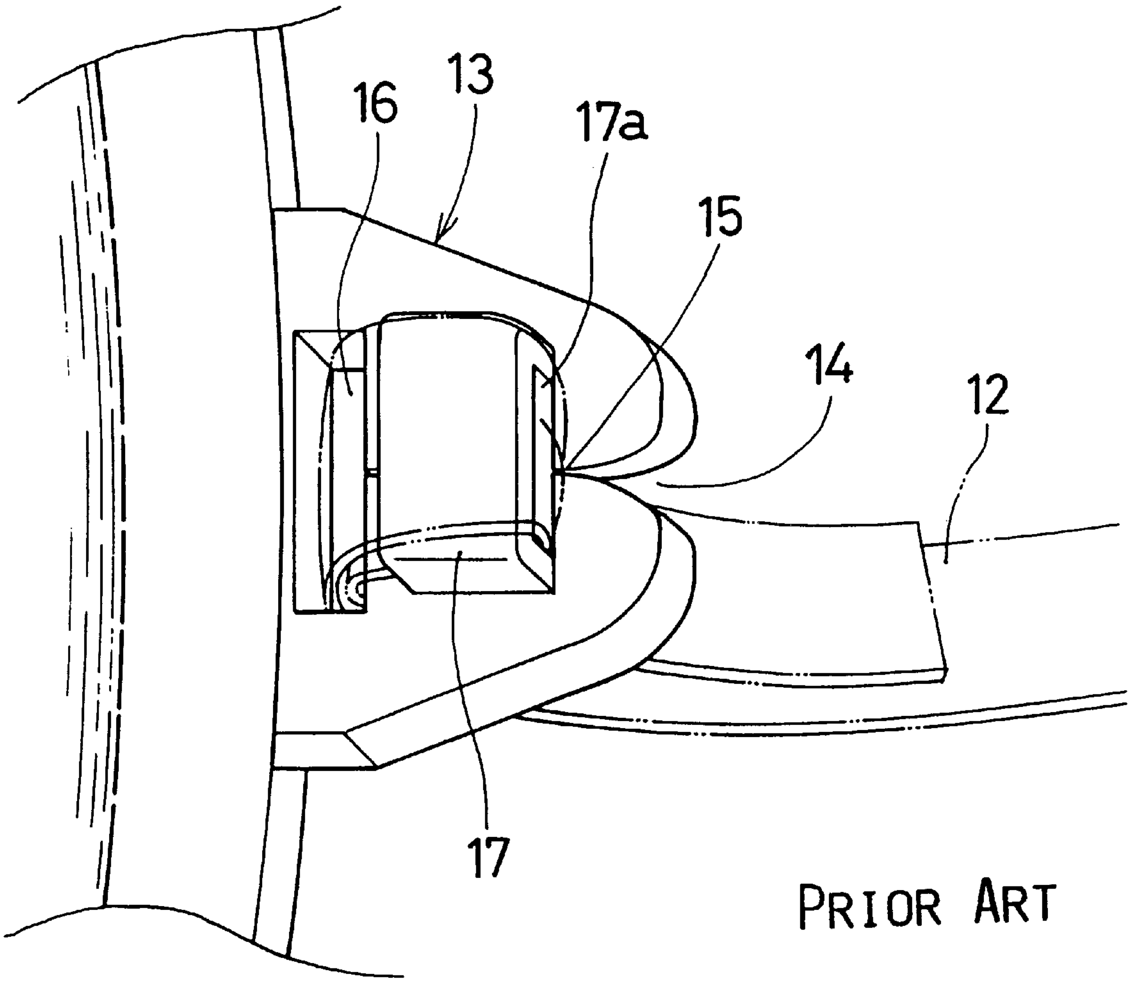
FIG. 11 is an enlarged view of the length adjusting mechanism in FIG. 10.
Figure 12:
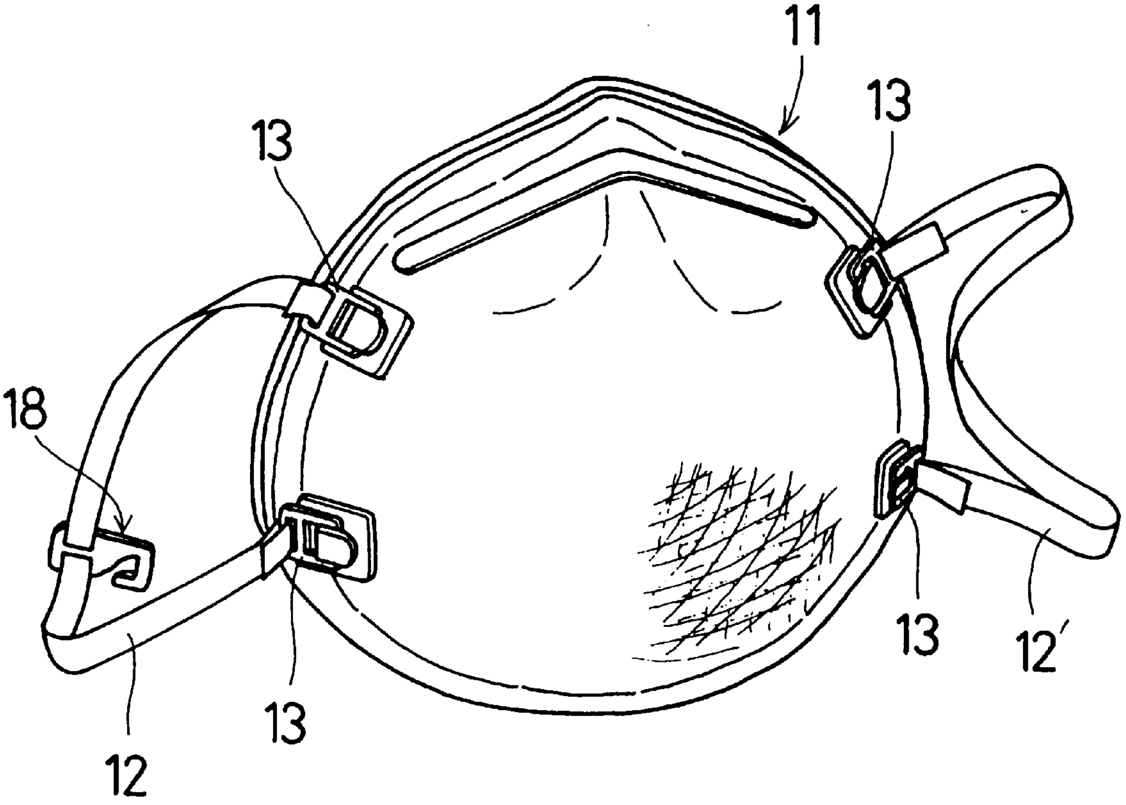
FIG. 12 is a perspective view showing another example of a conventional mask provided with an engaging member.
Figure 13:
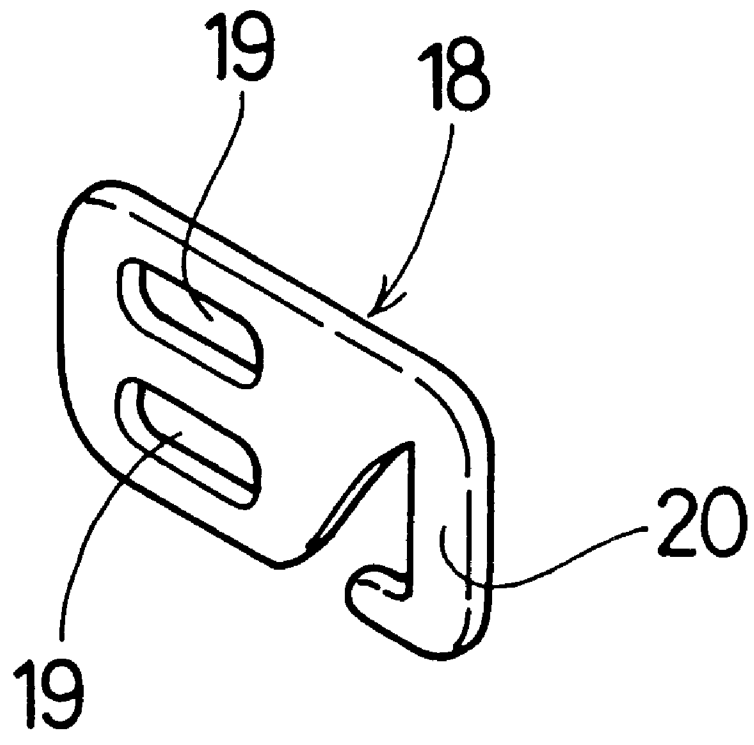
FIG. 13 is an enlarged view of the engaging member in FIG. 12.

In the embodiment as shown in FIG. 7, a wearer crosses one strap 3 of the mask 2 and the elastic thin plate 1, folds the elastic thin plate 1 back from the tip portion thereof with his fingers so as to surround the fastening strap 3, inserts all stepped hook portions 4, 4' into the long hole **5*a*, and releases his fingers. As a result, the narrow portion 7 behind the last stepped portions 4' which have passed the long hole 5*a* fits in between the step portions 5*b*, while the back ends of the last stepped portions 4' abut with the stepped portions 5*b* so that the stepped hook portions 4, 4' are prevented from moving through the piercing hole 5 and the length adjusting device is fitted to the fastening strap 3 of the mask 2 as shown in FIG. 9. FIG. 9 also shows by the one-dotted chain lines that the straps 3' are engaged on one set of the stepped portions of the length adjusting device 1**.

In use of the mask 2 having the length adjusting device for fastening straps in the above manner, a wearer puts the mask 2 on his mouth and passes both of the fastening straps 3, 3' fitted to the edge of the mask 2 to behind his head. Then, he hooks one set of opposing projecting hook portions 4, opposingly provided on the upper and lower sides of the elastic thin plate 1 fitted to the fastening strap 3, on the other fastening strap 3'. He may stepwise choose one proper set of the opposingly projecting hook portions 4 to engage with the other fastening strap 3', so that he may easily adjust the length of the fastening straps 3 to be suitable for him and to decrease the gap between the mask 2 and his face.

In the embodiments shown in FIGS. 1 to 6, if the length adjusting device for the fastening straps is not required, a wearer may easily remove it from the fastening strap 3 by opening the cuts 6 by his fingers and pulling out the fastening strap 3 inserted in the piercing holes 5. While in the embodiment in FIG. 7, he may release the narrow portion 7 from between the stepped portions **5*b* and pull all of the stepped hook portions 4, 4' through the long hole 5***a*, then he may easily remove the adjusting device from the fastening strap 3.

As constituted as stated above, the length adjusting device for fastening straps of a mask of the present invention has a simple structure and can be easily produced at a lower production cost. With the length adjusting device, the fastening straps can be easily adjusted to a suitable length, a comfortable fit can be obtained, and moreover it can be readily removed when unnecessary.

What is claimed is:

1. A length adjusting device for fastening straps of a mask, said length adjusting device being in a form of an elongated elastic thin plate which is engageable with fastening straps provided on both sides of the mask, comprising:

at least one piercing hole at a base end portion of the elastic thin plate, said at least one piercing hole for detachably fitting one of the fastening straps to the elastic thin plate; and plural sets of stepped hook portions opposingly provided on both an upper and a lower side of the elastic thin plate and inclined toward the base end portion thereof, and wherein one set of the plural sets of the stepped hook portions is readily, selectively hookable with an other strap of the mask so as to properly adjust a strap length around a wearer's head.

2. A length adjusting device according to claim 1, wherein the number of the at least one piercing hole is two and each piercing hole is provided with a cut through which the one of the fastening straps is settled into each of the holes.

3. A length adjusting device according to claim 2, wherein the cut inclines toward a tip side of the elastic thin plate.

4. A length adjusting device according to claim 1, wherein the number of the at least one piercing hole is one and the elastic thin plate folded back from a tip side portion thereof is inserted through the one piercing hole to surroundingly engage with the one of the fastening straps.

5. A length adjusting device according to claim 4, wherein said piercing hole is a transverse elongated hole with stepped portions for being engageable with one of said plural sets of stepped hook portions.

* * * * *